United States Patent [19]
Knee et al.

[11] Patent Number: 6,104,020
[45] Date of Patent: Aug. 15, 2000

[54] ELECTRONIC SHUTTER FOR A LOW DIFFERENTIAL LIGHT LEVEL PHOTO-RECEIVER CELL

[75] Inventors: Derek L. Knee; Brian J. Misek, both of Ft. Collins, Colo.

[73] Assignee: Agilent Technologies, Palo Alto, Calif.

[21] Appl. No.: 09/024,092

[22] Filed: Feb. 17, 1998

[51] Int. Cl.$^7$ .................................................. H01L 27/00
[52] U.S. Cl. ................... 250/208.1; 250/214 R; 257/223
[58] Field of Search ............... 250/308.1, 214 R, 250/214 A; 356/215; 257/223, 230, 233

[56] References Cited

U.S. PATENT DOCUMENTS

| | | | |
|---|---|---|---|
| 4,707,124 | 11/1987 | Hickey et al. | 355/83 |
| 4,989,094 | 1/1991 | Norita et al. | 348/298 |
| 5,149,980 | 9/1992 | Ertel et al. | 250/559.32 |
| 5,498,995 | 3/1996 | Szepesi et al. | 327/538 |
| 5,769,384 | 6/1998 | Baumgartner et al. | 250/214 A |
| 5,808,677 | 9/1998 | Yonemoto | 348/308 |
| 5,932,873 | 8/1999 | Bergemont et al. | 250/208.1 |

*Primary Examiner*—Que T. Le
*Assistant Examiner*—Thanh X. Luu

[57] ABSTRACT

Circuitry provides an electronic shutter capability to photo-receiving circuitry for the purpose of disabling integration of a photo-generating charge on an integration capacitor until a reading device reads the integrated signal from the integrating capacitor. With an input from a shutter control line of a high logic voltage, the shutter discontinues charging of the integrating capacitor until the integration capacitor is selectively connected to a read line. Upon receipt of a low logic voltage signal from the shutter control line, the shutter allows the integration capacitor to integrate a photo-receiving charge. The electronic shutter therefore provides well controlled integration time via shutter control. Another advantage is that the integration time is completely independent of the cell reading rate. Since integration time is independent of the cell reading rate, the shutter module allows for automatic gain control of photo-receiver charge integration when exposed to a wide range of light through shutter control.

17 Claims, 3 Drawing Sheets

ELECTRONIC SHUTTER FOR A LOW DIFFERENTIAL LIGHT LEVEL PHOTO-RECEIVER CELL

BACKGROUND OF THE INVENTION

1. Technical Field

The present invention relates generally to photoreceptors designed to operate at low light levels and more particularly to circuits for increasing the reliability of photoreceiver information acquired under conditions in which a signal-to-noise ratio is relatively small.

2. Related Art

An accurate determination of the path of a device across a surface is important in a variety of applications. For example, if a faithful representation of an image of a scanned original is to be acquired, there must be accurate information as to the travel of the scanning device along the original. Typically, the captured image provided by a scanner is a pixel data array that is stored in memory in a digital format. A distortion-free image requires a faithful mapping of the original image to the pixel data array.

U.S. Pat. No. 5,149,980 to Ertel et al., which is assigned to the assignee of the present invention, describes use of a cross-correlation function to determine the relative movement between an original and an array of photoelements in a given direction. The patent notes that the one-dimensional approach can be extended to determine the vector of two-dimensional relative movement between the original and the array, so as to track translation, rotation and scaling in a two-dimensional plane.

The patent to Ertel et al. describes use of an optical sensor array to collect a "signature" of an original. The signature may be provided by illuminating and imaging the surface texture or other optical characteristics of the original. The light intensity will vary on a pixel-by-pixel basis with variations in surface texture. By cross-correlating images of the surface of the original, relative movement between the array and the original can be ascertained.

A critical element of the design of a system such as the one described by Ertel et al. is circuitry to maintain the signal-to-noise ratio of each photoelement sufficiently high to reliably determine the signature of the original. If the signal is the difference in reflectivity from pixel to pixel as a result of slight variations in paper texture of a white paper, the variation in reflectivity may only be approximately six percent. The overall resolution goals translate into a relatively low signal-to-noise ratio for each photoelement, with the desired signal being the small change in reflectivity of the medium of interest and the dominant noise term being shot noise of the photodiode as a result of the fixed portion of the reflectivity. The reference to Ertel et al. uses averaging to increase the signal to noise ratio to obtain useful information.

U.S. Pat. No. 5,769,384, filed on Jan. 25, 1996, to Baumgartner et al., which is assigned to the assignee of the present invention, also describes the use of circuitry for an optical sensor array to collect a "signature" of an original. Applicants hereby incorporate U.S. Pat. No. 5,769,384 by reference in its entirety. A critical element of the Baumgartner et al. circuitry is a servo circuit in combination with a photoelement for biasing a base node via an emitter node of a phototransistor. The phototransistor base node is thereby maintained at a substantially fixed voltage, so that photo-current generated by reception of light energy is directed to a pixel storage or signal integration capacitor, rather than being used to charge and discharge parasitic capacitance of the phototransistor. Thus, the servo circuit of the photoelement maintains the bias point on the phototransistor base to efficiently deliver the light-induced current to the appropriate integration capacitor. Additionally, that circuit layout design achieves a high photoreception area.

However, although meritorious to an extent, the servo circuit of Baumgartner et al. includes several disadvantages. First, a direct result of the large base area of Baumgartner et al. is a large associated collector-base capacitance. That capacitance causes the servo circuit to respond very slowly to perturbations in the voltage of the base node. Furthermore, servo circuit response time is also a function of the ambient light falling on the photoelement. Therefore, the ability of the servo circuit to respond to dynamic variations in the incident light on the photoelement base is a function of the average or DC level of the incident light. Thus, if the incident light level is low, as it is in some image acquisition applications, then the servo circuit output bandwidth is also unacceptably low.

Furthermore, in Baumgartner et al., the optical sensor array includes a number of cells, wherein each cell includes one or more photoelements having associated integration capacitors. In the Baumgartner et al. system, integration capacitors are read in a distributed time period, by means of a read control line which signals the transfer of integration capacitor charge to a transfer amplifier. Thus, integration time for each integration capacitor depends on the length of the read time period. During image acquisition, however, each cell, or row of cells integrates at a different time although within the read time period, which causes image smearing across the array of photoelements.

What is needed is circuitry which permits reliable use of a photoelement signal in applications in which small light-intensity differentials are employed as application information.

Other objects, features and advantages of the present invention will become apparent upon reading the following specification, when taken in conjunction with the accompanying drawings.

SUMMARY OF THE INVENTION

Circuitry is employed to provide an improvement to a system for acquiring a sufficient signal-to-noise ratio in photoelement applications requiring small light intensity differentiation. Specifically, the circuitry provides an electronic shutter capability to photo-receiving circuitry for the purpose of disabling the integration of a photo-generating charge on an integrating capacitor until a reading device reads the integrated light signal from the integrating capacitor.

More specifically, the inventive circuitry includes a photoelement configured for creating a signal responsive to small light intensity differentiation, an integration capacitor for receiving and integrating the photoelement signal for periodic reading and further processing, and an electronic shutter module for periodically disabling the integration charge with the integration capacitor until the charge is read via a read device.

In accordance with the present invention, the electronic shutter mechanism is coupled to the photoelement and the integration capacitor and is responsive to a first input signal for diverting photoelement current away from the integration capacitor to temporarily disable the integration capacitor until it is read by the reading device. The shutter mechanism is also responsive to a second signal for directing the current to the integration capacitor for photoelement signal integration between read cycles.

In a preferred embodiment, the shutter mechanism works in conjunction with a servo circuit coupled to the photoelement. The servo circuit is used to bias a base node via an emitter node of a phototransistor. The base node is thereby maintained at a substantially fixed voltage, so that photocurrent generated by reception of light energy is directed to the light signal integrating or pixel storage capacitor. The use of the phototransistor provides current gain for a photodiode output.

More specifically, the servo circuit is a negative feedback loop in which a voltage variation at the base node of the phototransistor is translated to an inverse voltage variation at the emitter node. In the preferred embodiment, the base node is connected to a gate of a first transistor. A drain of the first transistor is connected to a source of a constant current, such as a transistor that establishes a high impedance. The drain of the first transistor is also connected to a gate of a second transistor that functions as a source follower for this operation. The source of the second transistor is connected to the emitter node of the phototransistor, while the drain is selectively connected to a fixed voltage source.

The integration capacitor may be connected from the collector of the phototransistor to the drain of the second transistor. As photocurrent is generated by the reception of light, the integration capacitor is charged. The integration capacitor is then selectively connected to a read line for output by a transfer amplifier.

In the preferred embodiment, the shutter module may comprise a first shutter transistor having a gate connected to the shutter signal line, a source node coupled to the servo circuitry and a drain coupled to a power source, and a second transistor having a gate connected to the shutter signal line, a source connected to the integration capacitor and a drain coupled to the servo means. While not critical to the invention, the first shutter transistor may be an n-type metal oxide semiconductor (NMOS) transistor and the second shutter transistor may be a p-type metal oxide semiconductor (PMOS) transistor.

In the preferred embodiment of the shutter module, with an input from the shutter line of a high logic voltage, the first MOS transistor is biased into a conductive state and the second MOS transistor is biased into a nonconductive state to direct photoelement current to the power supply and away from the integrating capacitor to discontinue charging of the integrating capacitor. In that mode, the electronic shutter circuitry is in the closed mode.

With an input from the shutter line of a low logic voltage, the second MOS transistor is biased into a conductive state and the first MOS transistor returns to a non-conducting state to direct photoelement current to the integration capacitor. In this mode, the electronic shutter circuitry is in the open mode.

In an alternative embodiment of the present invention, the shutter mechanism may comprise a single transistor having a gate connected to the shutter signal line, a drain connected to the second transistor in the servo circuitry and a source connected to ground. In the alternative embodiment, with a first high logic voltage input from the shutter line, the shutter transistor is biased into a conductive state in the servo circuitry, which pulls voltage at the gate of the second servo circuit transistor low to bias the second servo circuit transistor into a non-conducting state, which prevents light-generated current from the emitter node of the photoelement from reaching the integrating capacitor. In that mode, the electronic shutter circuitry is in the closed mode. With a second low logic voltage input from the shutter line, the shutter transistor is in a nonconductive state and the emitter node of the photoelement is unaffected, which allows the photoelement to charge the integrating capacitor. In that mode the electronic shutter circuitry is in an open mode. In this embodiment, the shutter transistor may be a NMOS device.

Finally, the present invention also relates to a method for processing an electrical signal generated in response to the reception of light. Specifically, the processing method includes the steps of generating a current signal in response to reception of light energy, integrating the current signal in response to a first input signal, ceasing the integration of the current signal response to a second input signal for allowing storage of the integrated signal for reading; and reading the stored, integrated current signal.

The ordinarily skilled artisan will understand the photoelements used in accordance with the first and second embodiments of the invention comprising only one element in an array of photoelements. In such an array, each photoelement or pairs of photoelements may have an associated shutter line for controlling the duration of the photoelement charge integration onto the integration capacitor for each element.

An advantage of the invention is that the electronic shutter may disable the integration of a photo-generated charge onto the integration capacitor, which allows the integration capacitor to hold its signal charge until it is read via a read device. The electronic shutter therefore provides well controlled integration. Another advantage is that the integration time is controlled by the electronic shutter and not by reading the cell. Since integration time is independent of the cell reading rate, the shutter module allows for automatic gain control of photo-receiver charge integration when exposed to a wide range of light through shutter control.

BRIEF DESCRIPTION OF THE DRAWINGS

The accompanying drawings incorporated in and forming a part of the specification illustrate several aspects of the present invention, and together with the description serve to explain the principles of the invention. The components in the drawings are not necessarily to scale, emphasis instead being placed upon clearly illustrating principles of the present invention. In the drawings appended hereto, like numerals illustrate like parts throughout the several views.

Figure 1:
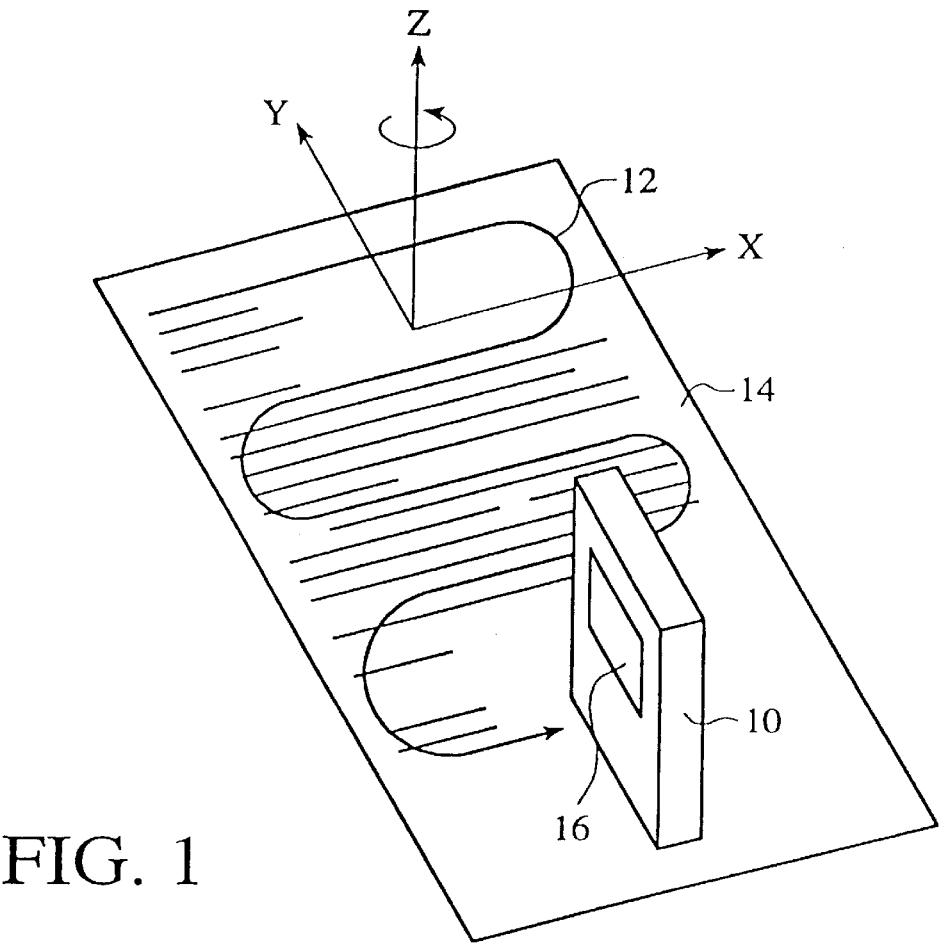
FIG. 1 is a perspective view of a hand-held scanning device following a meandering path on an original.

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

DETAILED DESCRIPTION

With reference to FIG. 1, a portable, hand-held scanning device 10 is shown as having followed a meandering path 12 along an original 14. The original may be a piece of paper, but the invention may be used with other image-bearing substrates. In use of the hand-held scanning device, the positions of inherent structural features, such as paper fibers, may be tracked and the resulting positional information may be used to rectify image data. However, the invention may be used in other applications.

The scanning device 10 is preferably self-contained and battery operated. However, the device may include a connection to an external source of power or to data ports of computers or networks. The scanning device includes an image display 16. The display may provide almost immediate viewing of a captured image. The display is not critical.

The scanning device 10 allows three degrees of freedom, with two being in translation and one in rotation. The first degree is the side-to-side movement (X axis movement) along the original 14. The second degree of freedom is movement upwardly and downwardly along the original (Y axis movement). The third degree of freedom is the ability to operate the device with rotational misalignment of a linear array of image sensor elements relative to the edge of the original 14 (q axis movement). That is, the linear array of imaging elements may have an angle of attack that is not perpendicular to the direction of device translation.

Figure 2:
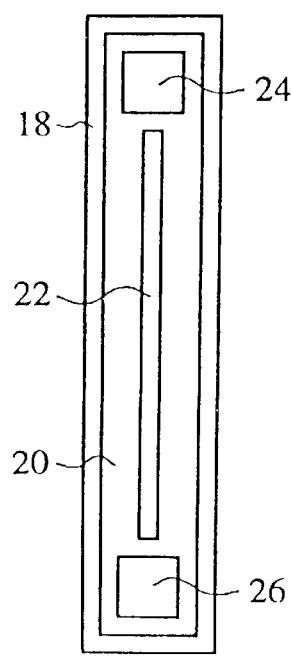
FIG. 2 is a bottom view of imaging and navigation sensors of the scanning device of FIG. 1.

Referring now to FIGS. 1 and 2, the bottom side 18 of the scanning device 10 includes a pivoting member 20 that aids in maintaining proper contact between the original 14 and an imaging sensor 22. Navigation sensors 24 and 26 are located at the opposed ends of the imaging sensor. Because the navigation sensors are mounted on the pivoting member, the navigation sensors are in a fixed location relative to the imaging sensor.

For reasons of physical compactness, the imaging sensor 22 is preferably a contact image device, but for applications in which compactness is less of a concern or a smaller image is desired, sensors employing projection optics may be employed, with magnification less than unity. Contact imaging devices typically employ lenses sold under the trademark SELFOC, which is a federally-registered mark of Nippon Sheet Glass Company Limited. Less conventionally, contact imaging can be obtained using interleaved array elements of sources and proximal sensors, without any imaging lenses. Conventional imaging sensors for scanning applications may be used. The imaging sensor may be part of a unit that also includes an illumination source, illumination optics, and image transfer optics.

In FIG. 1, the meandering path 12 is shown as having four and a fraction swaths, i.e., side-to-side passes across the original 14. A useful imaging sensor 22 for most applications has a length within the range of 25.4 mm and 101.6 mm. The swaths should include regions of overlap, so that a stitching process may be used to produce a faithful representation of the scanned original.

The scanning device 10 includes at least one navigation sensor 24 or 26. In the preferred embodiment, the device includes a pair of navigation sensors, with the sensors being at opposite ends of the imaging sensor 22. While one-dimensional arrays of photoelements that are mounted orthogonally to each other may be used, the much preferred embodiment is one in which each navigation sensor is a two-dimensional array of elements. The navigation sensors 24 and 26 are used to track movement of the scanning device 10 relative to the original.

Each navigation sensor is an array of photoelements that is formed on an integrated circuit substrate that includes readout and signal processing circuitry. The position accuracy necessary over the range of a pixel distance of 40 mm is 2.0 mm. The very high positional accuracy requires individual photoelements that are no larger than tens of microns in length in order to acquire sufficiently differing signals from element to element.

In the operation of the navigation sensors 24 and 26, the desired signal is the difference in reflectivity from pixel to pixel, as caused by variations along the surface of the original 14. Where surface variations are variations in paper texture along a white paper, the reflectivity may vary by only approximately six percent of the basic reflectivity of the white paper. The overall resolution goals would then translate into a signal-to-noise ratio of approximately two for each photoelement. The dominant noise term is the shot noise of the photoelement signal caused by the fixed portion of the reflectivity. The present invention addresses the signal-to-noise ration problem by providing a shutter capability to the photoelement servo circuit to enable automatic gain control of the photo-receiver charge integration when light sensors 24 and 26 exposed to a wide range of incident.

Figure 3:
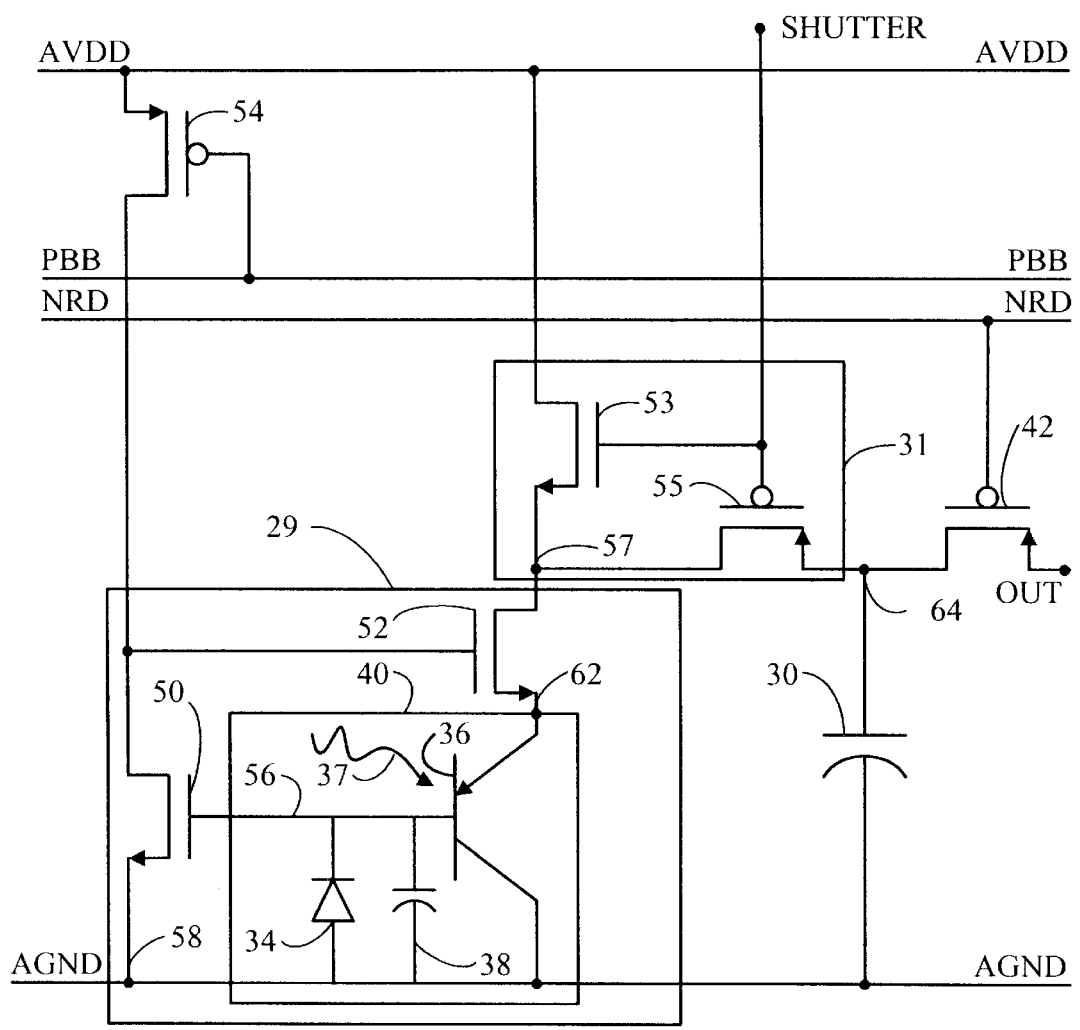
FIG. 3 is a photoelement circuit having an electronic shutter module in accordance with the invention.

FIG. 3 is a schematic diagram of a photoelement circuit which is incorporated into the integrated circuit substrate of light sensors 24 and 26. Incoming light 37 is converted into a current that is integrated during a sample period. The stored value is periodically read out, so that it is available for a next step in a processing sequence. At the start of an integration cycle, photocurrent that is generated by means of a photodiode 34 is amplified by a PNP transistor 36. The photodiode and the transistor, along with a parasitic capacitance 38, define a photoelement 40. The amplified photocurrent charges the integration capacitor 30 downwardly toward a level of about 1.50 volts The photodiode 34 of the photoelement 40 generates a current in response to reception of light photons. The photodiode is connected to the base of the PNP transistor 36. The reverse bias diode capacitance 38 is a parasitic capacitance that may be 0.16 pF. In this embodiment, the optical power on the photodiode was determined to be about 1.1 nW. This causes a current of approximately 0.6 nA in the diode current source. Because of the low current level, amplification is needed to ensure that the optical variation signal, which is only approximately six percent of the constant photocurrent, will create sufficient voltage differences to be distinguished from noise.

The PNP transistor 36 of the photoelement 40 amplifies the photocurrent. The amplification provided by the transistor allows use of an integration capacitor 30 that facilitates reproducibility from photoelement to photoelement. In the absence of amplification, the low current from the photodiode 34 would require a very small capacitor as an integrator in order to get a 1 volt swing, e.g. 10 pF. Because of the parasitics, this would be difficult to reproduce on an element-to-element basis. Changing the photoelement layout from a diode to a substrate PNP device is a convenient way of providing current amplification. A beta value of eighteen increases the output emitter current to 11.4 nA. Thus, an integration capacitor of 0.20 pF can be used. This facilitates reproducibility, but is not so large as to require excessive area.

A servo circuit 29 is formed by MOS transistors 50 and 52. The MOS transistors form a bias point amplifier with a common gate stage for the output of the phototransistor 36. MOS transistor 54 supplies the bias current via analog power supply line AVDD when the proper signal is received from bias voltage line PBB. To achieve proper transfer of the current generated in the photoelement 40 to the integration capacitor 30, the photodiode reverse voltage (i.e., the transistor base voltage) must be kept at a substantially constant level. If the voltage at the base node 56 were to be allowed to shift, the photocurrent would be at least partially consumed in charging and discharging the diode capacitance 38, rather than providing current to be amplified by the substrate PNP transistor 36.

The transistor base voltage at the node 56 is kept at a substantially fixed level by the three MOS transistors 50, 52 and 54. While not critical to achieving the desired operation, in the embodiment of FIG. 3, the substantially fixed voltage level is approximately equal to the NMOS threshold level above AVDD at the collector node 58. The MOS transistors operate as a negative feedback loop by means of transistor 52 operating as a source follower to the emitter node 62 of the PNP transistor 36. Thus, the base voltage is controlled by the emitter voltage of the transistor. This is possible because the base voltage, i.e. the photodiode output, has a very high DC impedance level. The bias technique of emitter control operated effectively during testing. From the output perspective, transistor 52 is a common gate stage that has an added advantage of providing additional isolation of the emitter node 62 and the base node 56 of the transistor from the voltage swing of a node 64.

The electronic shutter 31 is formed from NMOS transistor 53 and PMOS transistor 55. When a signal from input node SHUTTER is at a logic low, transistor 55 is in a conducting mode and transistor 53 is in a non-conducting mode. In this state, the servo circuit continues to discharge the integration capacitor 30. In this mode, electronic shutter circuit 31 is in an "open" mode. When a high logic signal is received from node SHUTTER, then transistor 53 is in a conducting mode and transistor 55 is in a non-conducting mode. In this state the photo-generated emitter current from photoelement 40 is diverted from the integration capacitor 30 to the power supply line AVDD. In this mode, electronic shutter circuit 31 is in a closed mode and integration capacitor 31 is not integrating any photo-generated charge. Thus, to end an integration period, electronic shutter circuit configured into a "closed" mode. During the closed mode integration capacitor 30 holds its charge until it is read.

At the end of a read period, a read switch 42 is turned "on" via a logic signal from line NRD to output the stored value in integration capacitor 30 to a transfer amplifier (not shown) via node OUT. The read switch may be a PMOS transistor that is controlled by a read control line NRD. In this manner, integration capacitor 30 holds its charge until it is read after the shutter circuit is in a closed mode until it is read via read transistor 42. The operation of the transfer amplifier (not shown) pulls the node 64 down to 1.50 volts. This accomplishes the transfer of the signal to transfer amplifier circuitry (not shown). At the conclusion of the transfer process, the read control line NRD is caused to return to a logic low and transistor 42 returns to a non-conducting state.

Figure 4:
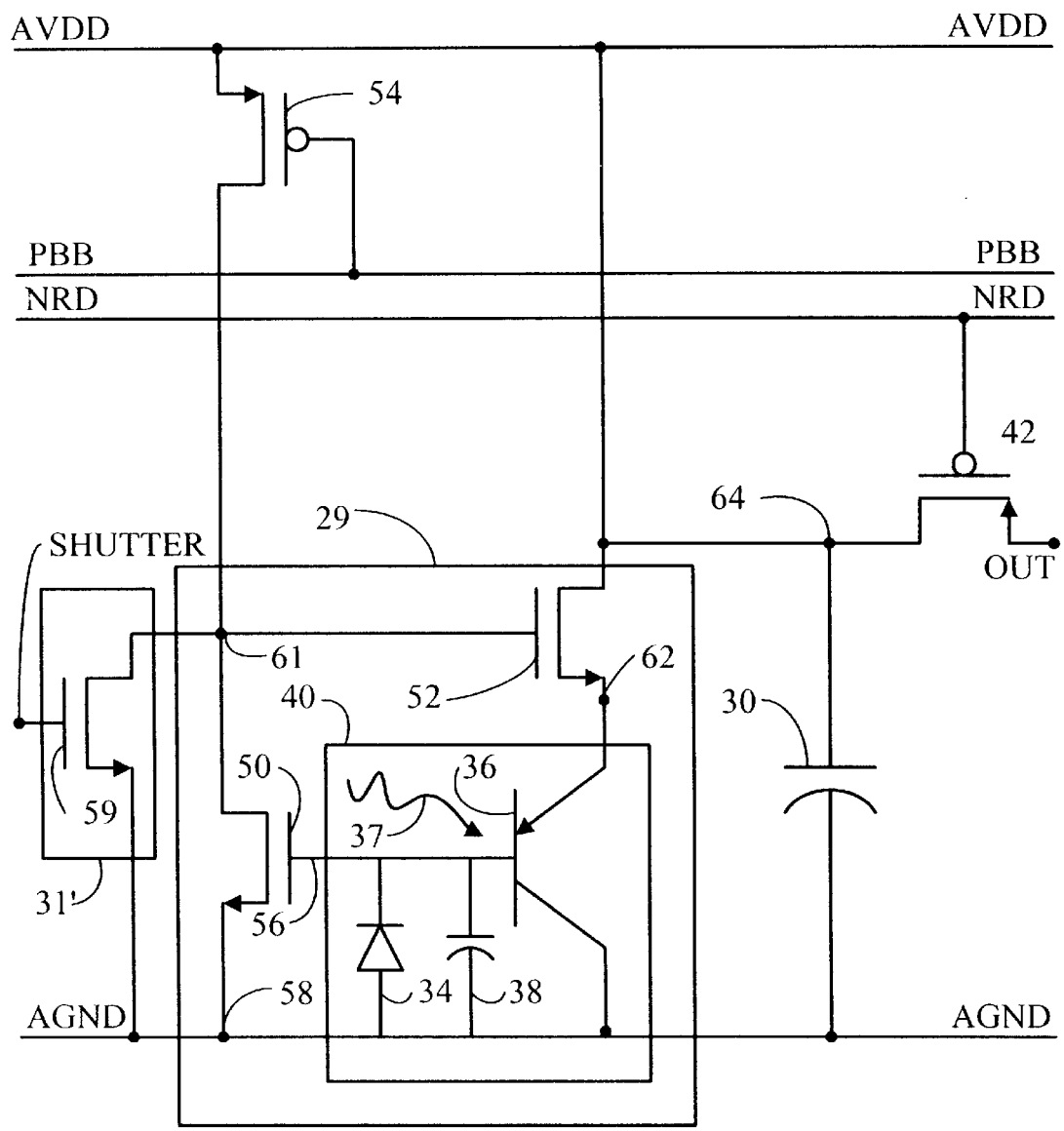
FIG. 4 is an alternative embodiment of a photoelement circuit having an electronic shutter module in accordance with the invention.

Referring now to FIG. 4, an alternative embodiment of an electronic shutter circuit 31' is shown. The photoelement circuitry 40 and servo circuitry 29 is identical to the preferred embodiment of FIG. 3, except that electronic shutter 31 is removed and alternative electronic shutter 31' is inserted between the AGND line and node 61. With an input signal of a logic low from node SHUTTER, NMOS transistor 59 is in a non-conducting state and the voltage and node 61 is unaffected. In this mode electronic shutter circuitry 31' is in an "open" mode and the integration capacitor 31 continues to charge. When node SHUTTER transmits a logic high to transistor 59, then transistor 59 enters into a conducting state. The voltage at node 61 is then pulled low via transistor 59. Consequently, transistor 52 enters into a non-conducting state. In the non-conducting state of transistor 52, photo-generated current is inhibited from reaching the integration capacitor 30. In that mode, the electronic shutter 31' is "closed" and capacitor 30 ceases from integrating further charge. The integration capacitor 30 then holds its charge until the charge is transferred to a transfer amplifier (not shown) via PMOS transistor 42 upon receipt of a logic high from line NRD.

An advantage of the invention is that the electronic shutters 31 and 31' may disable the integration of a photo-generated charge onto the integration capacitor 30, which allows the integration capacitor 30 to hold its signal charge until it is read via transistor 42. The electronic shutters 31 and 31' therefore provide well controlled integration. Another advantage is that the integration time is controlled by the electronic shutter and not by reading the cell. Since integration time is independent of the cell reading rate, the shutter module allows for automatic gain control of photo-receiver charge integration when exposed to a wide range of light through shutter control of the integration period.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A circuit for generating an electrical signal responsive to reception of light energy comprising:

a photoelement having an amplification device and a photoreceptor, said photoelement having an emitter node and a base node, said photoreceptor being connected to generate a current at said base node in response to reception of light energy;

an integration capacitor for charging upon receipt of said current;

an electronic shutter mechanism coupled to said photoelement and said integration capacitor;

a shutter node coupled to said shutter mechanism, said shutter node being configured to deliver a first input signal and a second input signal to said shutter mechanism;

said shutter mechanism responsive to said first input signal for diverting photoelement current away from said integration capacitor and responsive to said second input signal for directing said current to said integration capacitor; and a servo for dynamically stabilizing a voltage at said photoelement base node during reception of light energy by said photoreceptor, said servo including a feedback loop from said photoelement base node to said photoelement emitter node.

2. The circuit of claim 1 wherein said electronic shutter mechanism further comprises:

a first mechanism responsive to said first signal for coupling current generated by said photoelement to a power supply; and a second mechanism responsive to said second signal for coupling said current generated by said photoelement to said integration capacitor.

3. The circuit of claim 1 wherein the first mechanism comprises a first MOS transistor having a gate connected to a shutter signal line, an emitter node coupled to said servo means and a drain coupled to a power source; and wherein the second mechanism comprises a second MOS transistor having a gate connected to said shutter signal line, a source connected to said integration capacitor and a drain coupled to said servo means.

4. The circuit of claim 1 wherein the first MOS transistor is biased into a conductive state to direct current photoelement current to said power supply in response to said first shutter signal.

5. The circuit of claim 1 wherein the second MOS transistor is biased into a conductive state to direct photoelement current to said integration capacitor.

6. The circuit of claim 1 wherein said photoelement is one photoelement in an array of photoelements.

7. The circuit of claim 1 wherein said shutter mechanism connects said photoelement emitter node to ground in response to said first input signal, thereby directing said photoelement current from said integrating capacitor.

8. The circuit of claim 1 further comprising:
devices in said feedback loop to bias said photoelement base node via said emitter node, wherein said devices comprise a first MOS transistor having a gate connected to said photoelement base node and having a drain, a second MOS transistor having a gate connected to said drain of said first MOS transistor and having a source connected to said emitter node, thereby defining a negative feedback loop; and
wherein said shutter mechanism comprises a third MOS transistor having a gate connected to a shutter signal line, a drain connected said second MOS transistor gate and a source connected to ground.

9. The circuit of claim 1 wherein said photoelement is one photoelement in an array of photoelements.

10. A circuit for generating an electrical signal responsive to reception of light energy comprising:
generation means for generating a current signal in response to reception of light energy;
integration means for integrating said current signal;
reading means for reading said integrated current signal;
shutter means coupled to said generation means and said integration means;
a shutter node coupled to said shutter means, said shutter node being configured to deliver a first input signal and a second input signal to said shutter means,
wherein said shutter means is responsive to said first input signal for diverting said current signal away from said integration means to allow said integration means to store said integrated current signal for reading, and wherein said shutter means is responsive to said second signal for directing said current to said integration capacitor means to integrate said current signal after said integrated current signal has been read; and
servo means for dynamically stabilizing a voltage at said photoelement base node during reception of light energy by said photoreceptor, said servo means including a feedback loop from said photoelement base node to said photoelement emitter node.

11. The circuit of claim 10 wherein said photoelement is one photoelement in an array of photoelements.

12. The circuit of claim 10 wherein said shutter means includes a first mechanism responsive to said first signal for coupling current generated by said photoelement to a power supply, and a second mechanism responsive to said second signal for coupling said current generated by said photoelement to said integration capacitor.

13. The circuit of claim 10 wherein said shutter means connects said photoelement emitter node to ground in response to said first input signal, thereby directing said photoelement current from said integrating capacitor.

14. A method for providing automatic gain control of an electrical signal in a circuit, the electrical signal being responsive to reception of light energy, said method comprising the steps of:
providing a photoelement, a shutter and a shutter node coupled to the shutter, the photoelement having an amplifier and a photoreceptor, the photoreceptor being configured to generate a current signal in response to reception of light energy;
generating a current signal at the photoreceptor in response to reception of light energy;
integrating the current signal to produce an integrated current signal;
delivering a first signal from the shutter node to the shutter such that, in response thereto, the integrated current signal is stored for reading;
reading the integrated current signal;
delivering a second input signal from the shutter node to the shutter such that, in response thereto, the current signal is integrated; and
dynamically stabilizing a voltage at the photoelement during reception of light energy by the photoreceptor.

15. The method of claim 14, wherein the amplifier has an emitter node and a base node, and wherein the step of generating a current signal at the photoreceptor comprises generating a current signal at the base node in response to reception of light energy.

16. The method of claim 15, wherein the step of dynamically stabilizing a voltage at the photoelement comprises dynamically stabilizing a voltage at the base node.

17. The method of claim 15, wherein the step of dynamically stabilizing a voltage at the photoelement comprises providing a feedback loop from the base node to the emitter node.

* * * * *